United States Patent
Testicioglu et al.

(10) Patent No.: US 9,401,860 B2
(45) Date of Patent: Jul. 26, 2016

(54) HIGH PERFORMANCE QUALITY-OF-SERVICE PACKET SCHEDULING FOR MULTIPLE PACKET PROCESSING ENGINES

(71) Applicant: Citrix Systems, Inc., Fort Lauderdale, FL (US)

(72) Inventors: Mustafa Kutluk Testicioglu, Mountain View, CA (US); Seth K. Keith, Scotts Valley, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 199 days.

(21) Appl. No.: 13/963,936

(22) Filed: Aug. 9, 2013

(65) Prior Publication Data

US 2015/0043335 A1     Feb. 12, 2015

(51) Int. Cl.
*H04L 12/753*      (2013.01)
*H04L 12/813*      (2013.01)
*H04L 12/873*      (2013.01)
*H04L 12/851*      (2013.01)

(52) U.S. Cl.
CPC ............... *H04L 45/48* (2013.01); *H04L 47/20* (2013.01); *H04L 47/52* (2013.01); *H04L 47/24* (2013.01)

(58) Field of Classification Search
None
See application file for complete search history.

(56) References Cited

U.S. PATENT DOCUMENTS

| | | | | |
|---|---|---|---|---|
| 6,628,629 B1* | 9/2003 | Jorgensen | ...................... | 370/322 |
| 6,975,638 B1* | 12/2005 | Chen et al. | ...................... | 370/412 |
| 7,477,650 B2* | 1/2009 | Robotham et al. | ............ | 370/412 |
| 8,045,563 B2* | 10/2011 | Lee | .......................... | 370/395.41 |
| 8,400,915 B1* | 3/2013 | Brown et al. | .................. | 370/230 |
| 8,433,783 B2 | 4/2013 | Jackowski et al. | | |
| 2002/0085578 A1* | 7/2002 | Dell et al. | ...................... | 370/422 |
| 2002/0167950 A1* | 11/2002 | Chang et al. | .................. | 370/396 |
| 2003/0103514 A1* | 6/2003 | Nam et al. | ...................... | 370/412 |
| 2005/0135355 A1* | 6/2005 | Muthukrishnan et al. | .... | 370/389 |
| 2006/0029080 A1* | 2/2006 | Kappler et al. | ............ | 370/395.4 |
| 2007/0297348 A1* | 12/2007 | Trac | ....................... | H04L 47/10 370/254 |
| 2010/0278190 A1* | 11/2010 | Yip et al. | ...................... | 370/412 |
| 2013/0039182 A1* | 2/2013 | Das et al. | ...................... | 370/235 |

* cited by examiner

*Primary Examiner* — Redentor Pasia
(74) *Attorney, Agent, or Firm* — Finnegan, Henderson, Farabow, Garrett & Dunner, LLP

(57) ABSTRACT

A system and method is provided for optimizing network traffic. The system includes a packet engine of a plurality of packet engines configured to acquire a data packet, to store the data packet in a queue, and to provide a request including a packet token representing the data packet, information regarding the size of the data packet, and a connection token. The system also includes a packet scheduler configured to receive the request; schedule the data packet using the connection token and the information regarding the size of the data packet; and provide the packet token and a notification to the packet engine for allowing the packet engine for transmitting the data packet.

20 Claims, 9 Drawing Sheets

HIGH PERFORMANCE QUALITY-OF-SERVICE PACKET SCHEDULING FOR MULTIPLE PACKET PROCESSING ENGINES

FIELD

The present disclosure generally relates to quality control of data communication networks. Exemplary embodiments relate to methods and systems for providing high-performance packet optimization for multiple packet processing engines.

BACKGROUND

In high-performance packet processing, such as network-load balancing and deep packet inspection, it is common to use multiple packet engines running on different cores or even on different microprocessors. This configuration allows multiple packets to be processed in parallel since multiple packet engines process different packets at the same time. After the packet engine finishes processing the packet, the packet can then be prioritized and/or regulated to a certain rate using a central Quality-of-Service (QoS) device for sending through a bottleneck link (i.e., a physical device that transmits all packets processed by the multiple packet engines).

In order for the QoS device to send out all packets processed by the multiple packet engines, the QoS device can either receive a copy of a packet from the packet engine or share a packet memory with the packet engine. But performance penalties exist under both approaches. The first approach involves an inefficient copy operation for each packet provided to the QoS device, which must then process received packets before providing them to the link. And the second approach involves a central storage (such as a memory of a parallel processing system or a cache of a microprocessor) shared by the QoS device and the multiple packet engines. The central storage would store all packets and would allow the QoS device to have access to them. In this latter approach, however, because multiple packet engines can reside in different cores or different processors, sharing the storage place can cause a cache coherency issue such that the cache contents can be undesirably invalidated.

BRIEF DESCRIPTION OF THE DRAWINGS

Reference will now be made to the accompanying drawings showing example embodiments of this disclosure. In the drawings.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide high performance QoS packet scheduling for multiple packet processors, such as packet engines. The high performance QoS packet scheduling embodiments can avoid or mitigate the network traffic bottleneck and cache coherency issues and thus can improve the efficiency of the network traffic optimization.

Figure 1:
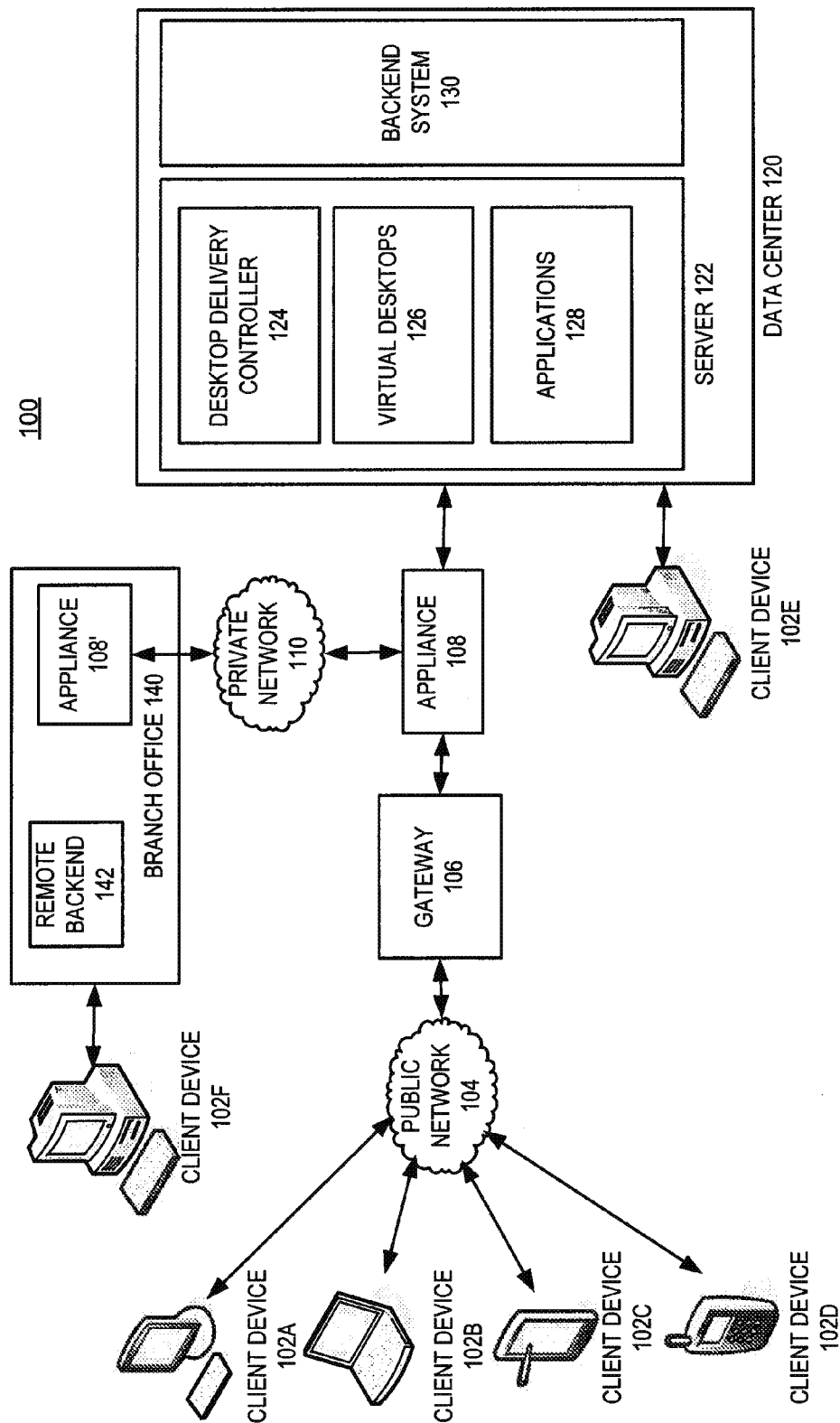
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102, a public network 104, a gateway 106, an appliance 108, a private network 110, a data center 120, and a branch office 140.

One or more client devices 102 are devices that can acquire remote services from data center 120 through various means. Client devices 102 can communicate with data center 120 either directly (e.g., client device 102e) or indirectly through a public network 104 (e.g., client devices 102a-d) or a private network 110 (e.g., client device 102O. When client device 102 communicates through public network 104 or private network 110, a communication link can be established. For example, a link can be established by public network 104, gateway 106, and appliance 108, thereby providing a client device (e.g. client devices 102a-d) access to data center 120. A link can also be established by branch office 140 including appliance 108', private network 110, and appliance 108, thereby providing a client device (e.g. client device 102O access to data center 120. While client devices 102 are portrayed as a computer (e.g., client devices 102a, 102e, and 102f), a laptop (e.g., client device 102b), a tablet (e.g., client device 102c), and a mobile smart phone (e.g., client device 102d), it is appreciated that client device 102 could be any type of device that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network or a wireless network.

Gateway 106 is a physical device or is software that is part of a physical device that interfaces between two networks having different protocols. Gateway 106, for example, can be a server, a router, a host, or a proxy server. In some embodiments, gateway 106 can include or be coupled to a firewall separating gateway 106 from public network 104 (e.g., Internet). Gateway has the ability to modify signals received from client device 102 into signals that appliance 108 and/or data center 120 can understand and vice versa.

Appliance 108 is a device that optimizes wide area network (WAN) traffic by including, for example, a QoS engine. In some embodiments, appliance 108 optimizes other types of network traffic, such as local area network (LAN) traffic, metropolitan area network (MAN) traffic, or wireless network traffic. Appliance 108 can optimize network traffic by, for example, scheduling data packets in an established communication link so that the data packets can be transmitted or dropped at a scheduled time and rate. In some embodiments, appliance 108 is a physical device, such as Citrix System's Branch Repeater, Netscaler, or CloudBridge. In some embodiments, appliance 108 can be a virtual appliance. In some embodiments, appliance 108 can be a physical device having multiple instances of virtual machines (e.g., virtual Branch Repeater). In some embodiments, a first appliance (e.g., appliance 108) works in conjunction with or cooperation with a second appliance (e.g., appliance 108') to optimize network traffic. For example, the first appliance can be located between the WAN and a corporate LAN (e.g., data center 120), while the second appliance can be located between a branch office (e.g., branch office 140) and a WAN connection. In some embodiments, the functionality of gateway 106 and appliance 108 can be located in a single physical device. Appliances 108 and 108' can be functionally the same or similar. Appliance 108 is further described below corresponding to FIG. 3A.

Data center 120 is a central repository, either physical or virtual, for the storage, management, and dissemination of data and information pertaining to a particular public or private entity. Data center 120 can be used to house computer systems and associated components, such as one or physical servers, virtual servers, and storage systems. Data center 120 can include, among other things, one or more servers (e.g., server 122) and a backend system 130. In some embodiments data center 120 can include gateway 106, appliance 108, or a combination of both.

Server 122 is an entity represented by an IP address and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications 128 to one or more endpoints (e.g., client devices 102a-f or branch office 140). For example, applications 128 can include Windows™-based applications and computing resources.

Desktop delivery controller 124 is a device that enables delivery of services, such as virtual desktops 126 to client devices (e.g., client devices 102a-f or branch office 140). Desktop delivery controller 124 provides functionality required to manage, maintain, and optimize all virtual desktop communications.

In some embodiments, the services include providing one or more virtual desktops 126 that can provide one or more applications 128. Virtual desktops 126 can include hosted shared desktops allowing multiple user to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Backend system 130 is a single or multiple instances of computer networking hardware, appliances, or servers in a server farm or a bank of servers and interfaces directly or indirectly with server 122. For example, backend system 130 can include Microsoft™ Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of a local area network (LAN) that is part of the WLAN having data center 120. Branch office 140 can include, among other things, appliance 108' and remote backend 142. In some embodiments, appliance 108' can sit between branch office 140 and private network 110. As stated above, appliance 108' can work with appliance 108. Remote backend 142 can be set up in similar manner as backend system 130 of data center 120. Client device 102f can be located on-site to branch office 140 or can be located remotely from branch office 140.

Figure 2A:
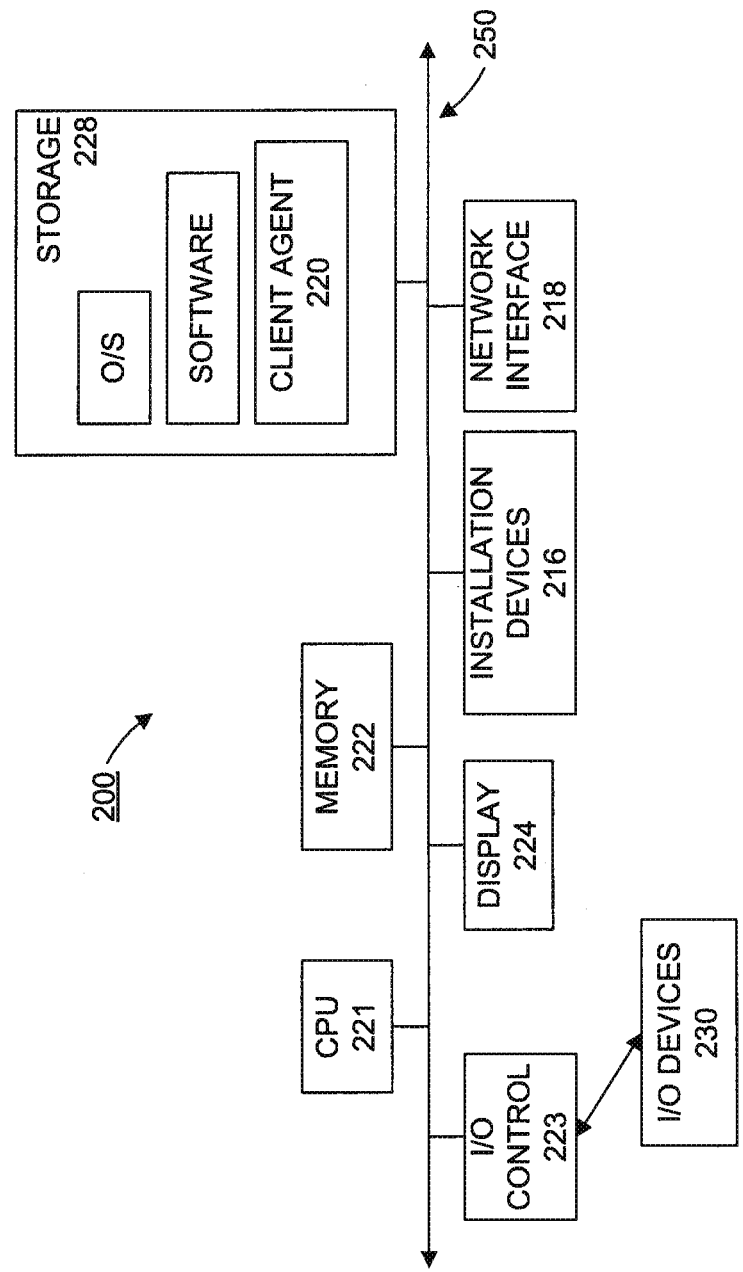
FIGS. 2A-2B are block diagrams of an exemplary computing device, consistent with embodiments of the present disclosure.
Figure 2B:
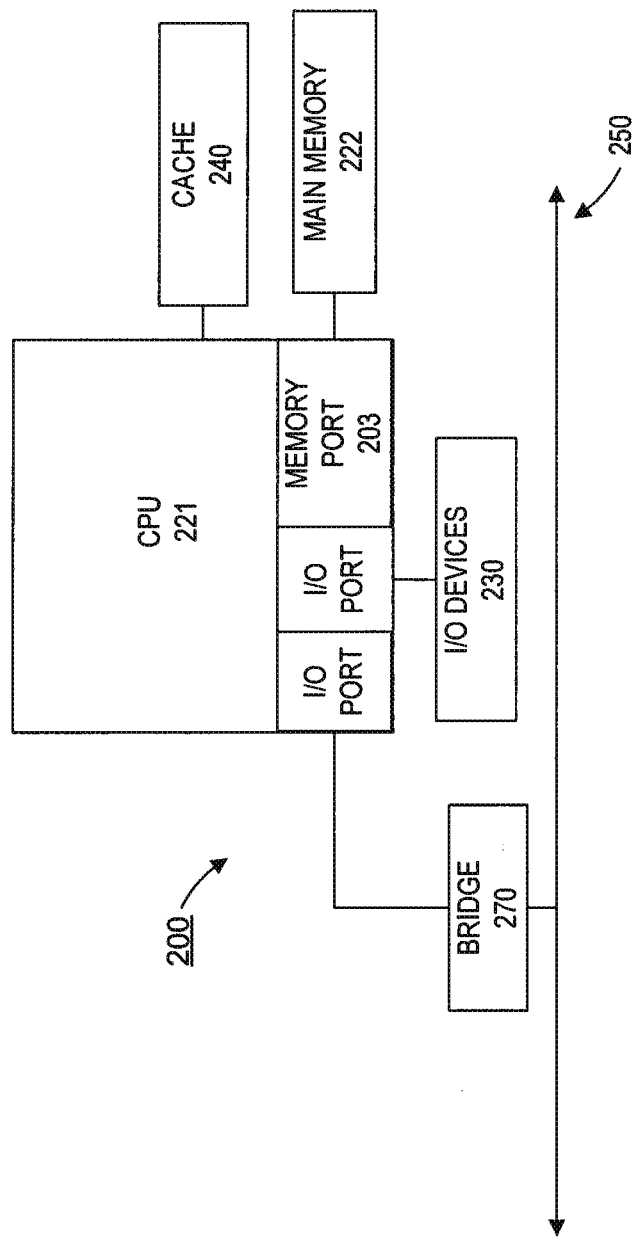

Appliances 108 and 108' and gateway 106 can be deployed as or executed on any type and form of computing device, such as a computer or networking devices capable of communicating on any type and form of network described herein. As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus, sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port. In further embodiments, I/O device 230 can be a bridge 270 between system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 2A, computing device 200 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3A:
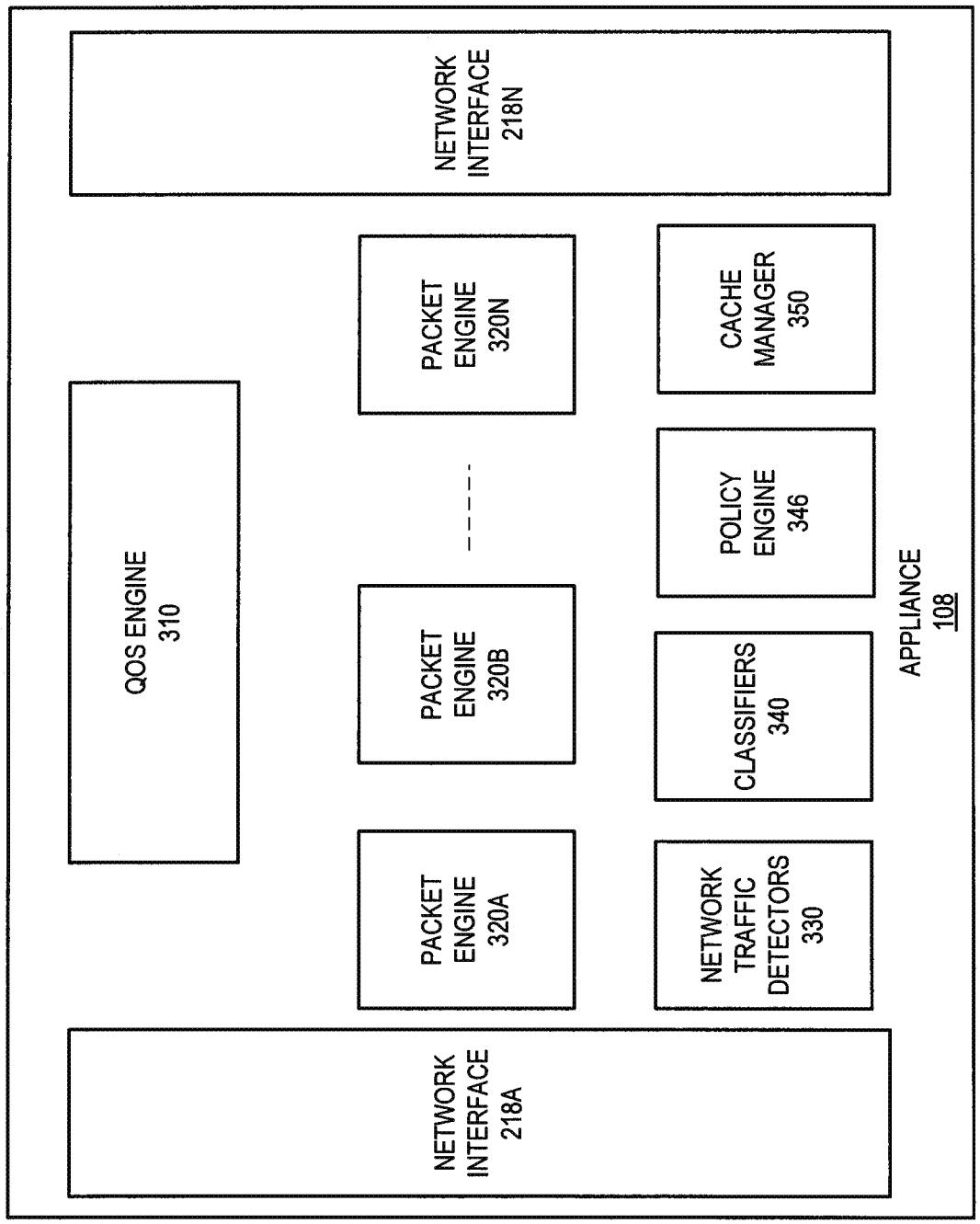
FIG. 3A is a block diagram of an exemplary appliance illustrated in FIG. 1, consistent with embodiments of the present disclosure.

FIG. 3A is a block diagram of an exemplary appliance 108 illustrated in FIG. 1, consistent with embodiments of the present disclosure. Appliance 108 can include one or more network interfaces 218A-N consistent with network interface 218 of FIG. 2A, a QoS engine 310, one or more packet engines 320A-N, one or more network traffic detectors 330, one or more classifiers 340, a policy engine 346, and a cache/cache manager 350.

QoS engine 310, which is also referred to as a QoS controller, a QoS engine, or a packet scheduler, can perform one or more optimization techniques (e.g., Quality of Service (QoS) techniques) to improve the performance, operation, or quality of service of any type of network traffic. QoS engine 310 can perform these techniques, for example, by using defined logic, business rules, functions, or operations. In some embodiments, QoS engine 310 can perform network traffic optimization and management mechanisms that provide different priorities to different users, applications, data flows, or connections. QoS engine 310 can also control, maintain, or assure a certain level of performance to a user, application, data flow, or connection. For example, QoS engine 310 can control, maintain, or assure a certain portion of bandwidth or network capacity of a communication link for a user, application, data flow, or connection. In some embodiments, QoS engine 310 can monitor the achieved level of performance or the quality of service (e.g., the data rate and delay) corresponding to a user, application, data flow, or connection and then dynamically control or adjust scheduling priorities of data packets to achieve the desired level of performance or quality of service.

QoS engine 310 can determine the service class or connection prioritization using configuration information acquired from the data packets received and stored at, for example, packet engines 320A-N, but without the data packets being physically forwarded to QoS engine 310. The data packets received and stored at packet engines 320A-N may or may not include configuration information. To include configuration information, the data packets received and stored at packet engines 320A-N can be modified by, for example, one or more classifiers 340. After determining the service class or connection prioritization, QoS engine 310 can establish or update a classification tree. Using the classification tree and data-packet information received from one or more packet engines, QoS engine 310 can authorize the corresponding packet engine to transmit the data packet. The data-packet information can include a packet token, a connection token, information regarding the size of the data packet, and, for some embodiments, configuration information, all of which are further described below.

In some embodiments, QoS engine 310 uses the classification tree to prioritize, schedule, and instruct packet engines 320A-N to process data packets according to a defined policy of network traffic optimization and a classification of network connections. Such classification mechanisms can include or be based on the Hierarchical Packet Fair Queuing (H-PFQ) algorithm, the Hierarchical Worst-case Fair Weighted Fair Queuing (H-WF$^2$Q), the H-WF$^2$Q+ algorithm, or a variation thereof. The implementation of the classification tree can be a data structure constructed in any language, some of which include C++, Boost Java, Python, PHP, Perl, Apple Core Foundation library, Go library, etc. It is appreciated that the classification tree can be implemented in firmware source code, hardware source code, or a combination of software source code, firmware source code, and/or hardware source code. The use of an exemplary classification tree will be further described below.

One or more packet engines 320A-N, which are also referred to as packet processing engines, packet processors, or data processors, are responsible for controlling and managing the processing of data packets received and transmitted by appliance 108 via network interfaces 218A-N. Packet engines 320A-N can operate at the data link layer (layer 2), network layer (layer 3), or the transport layer (layer 4) of a network stack (e.g., such as the layers and protocols of the Open System Interconnection communications model). In some embodiments, the data packets can be carried over the data link layer via the Ethernet communication protocol, which can comprise any of the family of WAN or LAN protocols, such as those protocols covered by the IEEE 802.3. In some embodiments, the network stack can have any type and form of wireless protocols, such as IEEE 802.11 and/or mobile internet protocols. In some embodiments, one or more packet engines 320A-N intercept or receive data packets at the network layer, such as via the IP communication protocol. In some embodiments, one or more packet engines 320A-N intercept or receive data packets at the transport layer, such as via the TCP or UDP communication protocols. In some embodiments, one or more packet engines 320A-N can operate at any session or any application layer above the transport layer.

One or more packet engines 320A-N can include a buffer for queuing one or more data packets during processing of the data packets. Additionally, one or more packet engines 320A-N can communicate via one or more communication protocols to transmit and receive network data packets via network interfaces 218A-N. In some embodiments, one or more packet engines 320A-N can send scheduling requests to QoS engine 310 for scheduling of data packets received and stored at packet engines 320A-N. After one or more packet engines 320A-N receive responses from QoS engine 310, packet engines 320A-N process, e.g., send or drop, the stored data packets according to the received response.

During operations of appliance 108, packet engines 320A-N can be interfaced, integrated, or be in communication with any portion of appliance 108, such as QoS engine 310, network traffic detectors 330, classifiers 340, policy engine 346, and/or cache manager 350. As such, any of the logic, functions, or operations of QoS engine 310, network traffic detectors 330, classifiers 340, policy engine 346, and/or cache manager 350 can be performed in conjunction with or in responsive to packet engines 320A-N.

One or more network traffic detectors 330 can include any logic, business rules, functions, or operations for automatically detecting the type of network traffic corresponding to data packets acquired by packet engines 320A-N. As described above, packet engines 320A-N can store and transmit data packets from any type of network traffic, such as data packets from any communication protocols including WAN, MAN, LAN, and wireless communication protocols. In some embodiments, not all network traffic is optimized by QoS engine 310. For example, QoS engine 310 can be used to optimize the WAN traffic, but not the LAN traffic or traffic directed to management. Network traffic detectors 330 can detect the type of network traffic received at packet engines 320A-N by any available techniques, such as by using IP addresses.

Using the type of network traffic detected by network traffic detectors 330, one or more classifiers 340 can identify data packets for scheduling and also provide configuration information. Identifying the data packets and providing configuration information can be performed either in-band or out of band. When they are performed in-band, the data packets can be modified. For example, one or more classifiers 340 can modify the data packet to identify the data packet for scheduling and to provide configuration information for maintaining, updating, or generating a classification tree. As a result, the identification of data packets for scheduling and configuration information can be transmitted with the data packet itself (i.e., in-band) or a representation of the data packet. In-band transmission can avoid the need to copy data packets and can also avoid packet fragmentation due to an increasing packet size.

As an example of modifying the data packet for in-band transmission, one or more classifiers 340 can mark a source MAC address to indicate that the associated data packet needs scheduling, and also encode the source MAC address with configuration information. For example, one or more classifiers 340 can mark one or more bits in the most significant byte of the source MAC address to indicate that the source MAC address is encoded. The encoded source MAC address can indicate that the particular data packet will be scheduled by QoS engine 310. As an example, if one or more network traffic detectors 330 determine that a first data packet is from a WAN protocol connection, such as a TCP connection, one or more classifiers 340 can then encode the source MAC address to indicate that the first data packet needs to be scheduled by QoS engine 310. Subsequently, one or more packet engines 320A-N can send a scheduling request to QoS engine 310 for scheduling the first data packet.

As another example, if one or more network traffic detectors 330 determine that a second data packet is from a LAN protocol connection, such as an IEEE 802.3 type connection, then one or more classifiers 340 may not encode the source MAC address of the second data packet, and thus the second data packet will not be scheduled by QoS engine 310. In some embodiments, one or more network traffic detectors 330 can be combined or integrated physically or functionally with one or more classifiers 340 or other devices of appliance 108.

One or more classifiers 340 can also provide configuration information. In some embodiments, one or more classifiers 340 can provide configuration information of the data packets to packet engines 320A-N according to a predefined traffic optimization configuration policy provided by, for example, policy engine 346. Configuration information can include, for example, a link identification, a link rate for the identified link, an identification of a service class, a priority associated with the service class, a service class rate, an identification of a sub-class, and a priority associated with the sub-class. As an example, one or more classifiers 340 can identify a plurality of communication links and assign link identification to the identified communication links. For a particular link and a service class corresponding to one or more data packets received and stored by packet engines 320, one or more classifiers 340 can determine, for example, that the link rate is 4 GBps and that the service class is a high priority. One or more classifiers 340 can then provide the link rate and the service class by modifying the one or more data packets, such as by encoding them into the source Media Access Control (MAC) addresses of the one or more data packets.

In some embodiments, one or more classifiers 340 can provide configuration information by accessing one or more queues that store data packets, and modifying the data packets, for example, by encoding source MAC addresses. One or more packet engines 320A-N can also forward the received data packets to one or more classifiers 340 for providing the configuration information. When in-band message data are used for identifying data packets for scheduling and providing configuration information, one or more classifiers 340 can modify the data packets (with, e.g., encoded source MAC addresses) and send the modified data packets back to one or more packet engines 320A-N. In some embodiments, when identifying data packets for scheduling and providing configuration information are performed out of band, data packets stored at packet engines 320A-N are not modified, and the identification and configuration information can be communicated to QoS engine 310 in other manners. Additionally, one or more classifiers 340 can also buffer, queue, amplify, repeat, or store data packets received from the packet engines 320.

In some embodiments, one or more classifiers 340 can construct the classification tree, such as classification tree 400 described below. One or more classifiers 340, can receive and analyze network traffic from network traffic detectors 330, and construct or revise the classification tree. In some embodiments, network traffic detector 330 analyzes the traffic and provides information to one or more classifiers 340. It is appreciated that one or more classifiers 340 and other classifiers can access the classification tree from a central location, in memory 222, storage 228, and/or memory/storage associated with one or more network interfaces 218A-N. In some other embodiments, one or more classifiers 340 and other classifiers can maintain separate copies of the classification tree, in separate memories, storage devices, and/or memory/storage devices associated with one or more network interfaces.

As described above, QoS engine 310 can construct or update a classification tree. QoS engine 310 can also maintain a copy of the classification tree that one or more classifiers 340 construct. The classification tree can be implemented, in part, by using the H-WF2Q+ algorithm or some other algorithms. It is appreciated that the classification tree can be stored in a central location, in memory 222, storage 228, and/or memory/storage associated with one or more network interfaces 218A-N, allowing QoS engine 310 and one or more classifiers 340 to access it. It is also appreciated that QoS engine 310 and the one or more classifiers 340 can have separate copies of the classification tree, in separate memories, storage devices, and/or memory/storage devices associated with one or more network interfaces.

Appliance 108 can also include a policy engine 346, also referred to as a policy controller or a policy provider. Policy engine 346 can include any logic, function, or operations for providing and applying one or more policies or rules to the function, operation, or configuration of any portion of the appliance 108. In some embodiments, policy engine 346 provides a configuration mechanism to allow a user to identify, specify, define, or configure a policy for appliance 108, or any portion thereof. For example, policy engine 346 can provide a predefined traffic optimization configuration policy including the number of priorities, the priorities associated with each service class, the number of connections allowed under each service class, connection bandwidth configuration, and any other policy information. Policy engine 346 can also provide policies for what data to cache, when to cache the data, for whom to cache the data, when to expire an object in cache, or when to refresh the cache. Policy engine 346 can also include any logic, rules, functions, or operations for determining and providing access, control, and management of data packets received and stored by packet engines 320A-N. Policy engine 346 can also include any logic, rules, functions, or operations for determining and providing access, control and management of security, network traffic, network access, compression, or any other function or operation performed by appliance 108.

In some embodiments, policy engine 346 can apply one or more policies based on any one or more of the following: a user, an identification of the client, an identification of the server, the type of connection, the time of the connection, the type of network, the contents of the network traffic, a field or header of a data packet received via any communication protocol, or any payload of a data packet. For example, policy engine 346 can apply a policy based on identifying a certain portion of content of an application layer (layer 7) communication protocol carried as a payload of a transport layer packet. In another example, policy engine 346 can apply a policy based on any information identified by a client, server, or user certificate. Policy engine 346 can also apply a policy based on any attributes or characteristics obtained about a client 102, such as via any type and form of endpoint detection.

Cache manager 350 can include software, hardware, or any combination of software and hardware to store data, information, and objects to a cache in memory or storage; to provide cache access; and to control and manage the cache. The data, objects, or content processed and stored by cache manager 350 can include data in any format, such as a six-byte MAC address, a TCP data packet, or any type of data communicated via any communication protocol. Cache manager 350 can duplicate original data stored in a slow-access storage and store the data in a fast-access cache memory, such as cache 240. After the data is stored in the cache, future use can be made by accessing the cached copy rather than refetching or recomputing the original data, thereby reducing the access time. In some embodiments, the cache can comprise a data object in memory of the appliance 108. In some embodiments, the cache can comprise any type and form of storage element of the appliance 108, such as a portion of a hard disk. In some embodiments, as described above, the processing unit of the device, such as CPU 221, can provide cache memory for use by cache manager 350. Cache manager 350 can use any portion and combination of main memory 222, storage 228, or CPU 221 for caching data, objects, and other content. Cache manager 350 can comprise any type of general purpose processor (GPP), or any other type of integrated circuit, such as a Field Programmable Gate Array (FPGA), Programmable Logic Device (PLD), or Application Specific Integrated Circuit (ASIC).

Figure 3B:
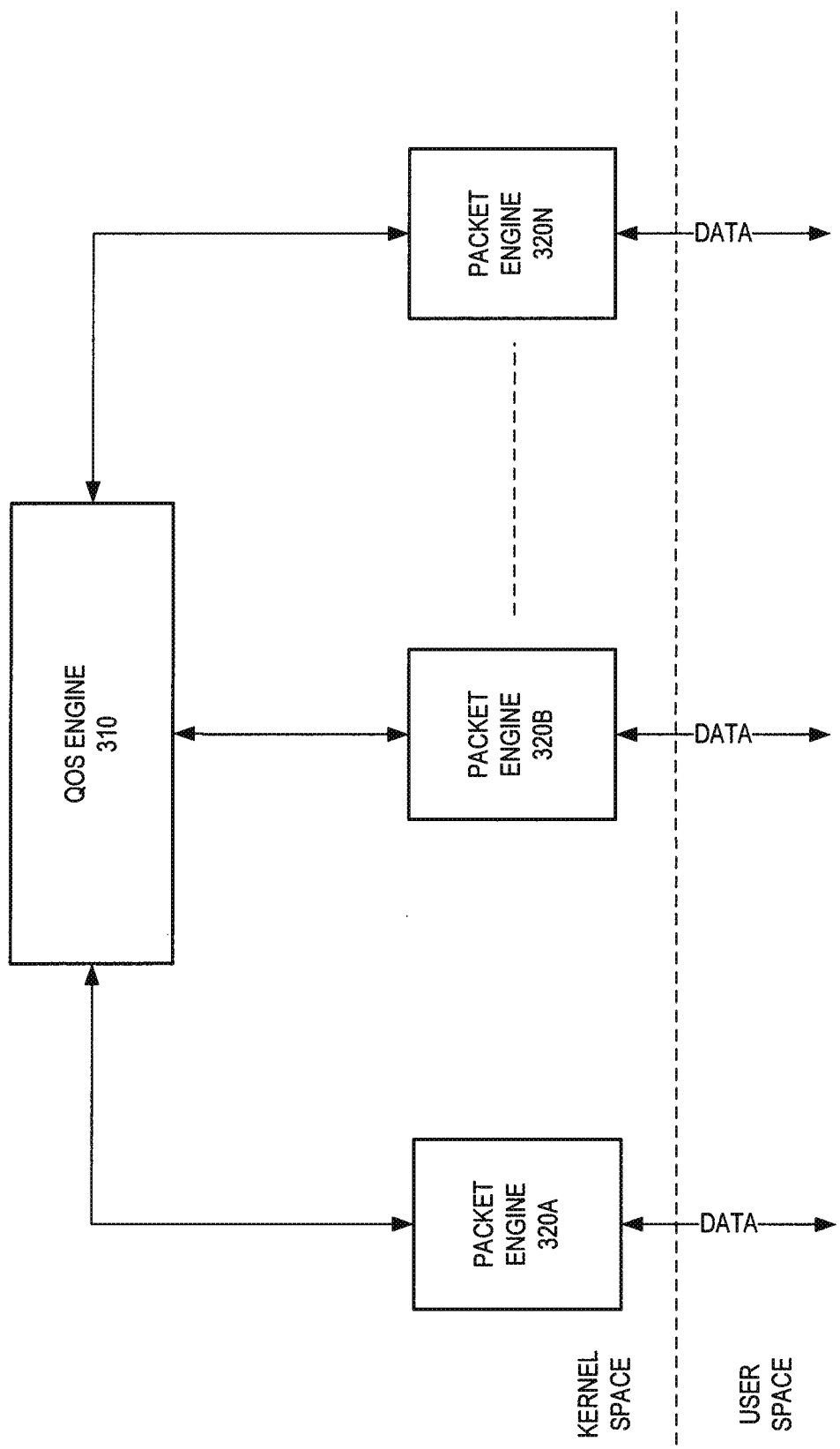
FIG. 3B is a block diagram of a portion of an exemplary appliance illustrated in FIG. 3A, consistent with embodiments of the present disclosure.

FIG. 3B is a block diagram of a portion of exemplary appliance 108 illustrated in FIG. 3A, consistent with embodiments of the present disclosure. In some embodiments, the operating system of appliance 108 allocates, manages, or otherwise segregates the available system memory into what is referred to as kernel space (system space) and user space (application space). The kernel space is typically reserved for running the kernel, including any device drivers, kernel extensions, or other kernel related software. The kernel can be the core of the operating system, and provides access, control, and management of resources and hardware-related elements of the appliance 108. In accordance with some embodiments of the appliance 108, the kernel space can also include a number of network services or processes working in conjunction with QoS engine 310 and one or more packet engines 320A-N, or any portion thereof. Additionally, the embodiments of the kernel can depend on the operating system installed, configured, or otherwise used by appliance 108.

User space is the memory area or portion of the operating system used by user mode applications or programs otherwise running in user mode. A user mode application cannot access kernel space directly and uses service calls to access kernel services. The operating system uses the user space for executing or running applications and provisioning of user level programs, services, processes, and/or tasks. As an example, the operating system can execute software of network interfaces 218A-N in the user space.

In some embodiments, within the kernel space, QoS packet scheduling is performed by dispatching scheduling requests to a packet scheduling process performed by QoS engine 310. The packet scheduling process performed by QoS engine 310 is a process not executed by packet engines 320A-N (i.e., a non-packet engine process). In the packet scheduling process, QoS engine 310 communicates with one or more packet engines 320A-N through, for example, one or more of packet scheduling queues, such as a pair of wait-free or lock-free queues, at QoS engine 310. Packet scheduling queues can be used, for example, to carry or store scheduling requests, which can include connection tokens, information regarding the size of the data packet, and packet tokens. In some embodiments, the packet token can be a pointer to the data packet stored at the corresponding packet engine (or a queue associated with the corresponding packet engine). Moreover, in some embodiments, the scheduling request can further include configuration information such as a link identification, a link rate for the identified link, an identification of a service class, a priority associated with the service class, a service class rate, an identification of a sub-class, and a priority associated with the sub-class. The configuration information is used, for example, when QoS engine 310 establishes or updates the classification tree for scheduling the data packets.

In the packet scheduling process, QoS engine 310 receives a scheduling request for scheduling a data packet stored at a packet engine of one or more packet engines 320A-N. Using the information contained in scheduling request, QoS engine 310 can schedule the data packet without having to possess or access the data packets received and stored at the packet engine. Furthermore, in a packet scheduling process, after QoS engine 310 schedules the data packet based on the scheduling request and sends QoS engine 310 a QoS scheduling message to the packet engine for transmission of the corresponding data packet.

The QoS scheduling message can include the packet token identifying the data packet being scheduled and a notification for allowing the packet engine for transmission of the corresponding data packet. As an example, QoS engine 310 can send the QoS scheduling message to the packet engine by including a notification requesting that the corresponding TCP data packet be transmitted immediately; or can send a notification to another packet engine by including another notification requesting that the corresponding TCP data packet be dropped.

Figure 4:
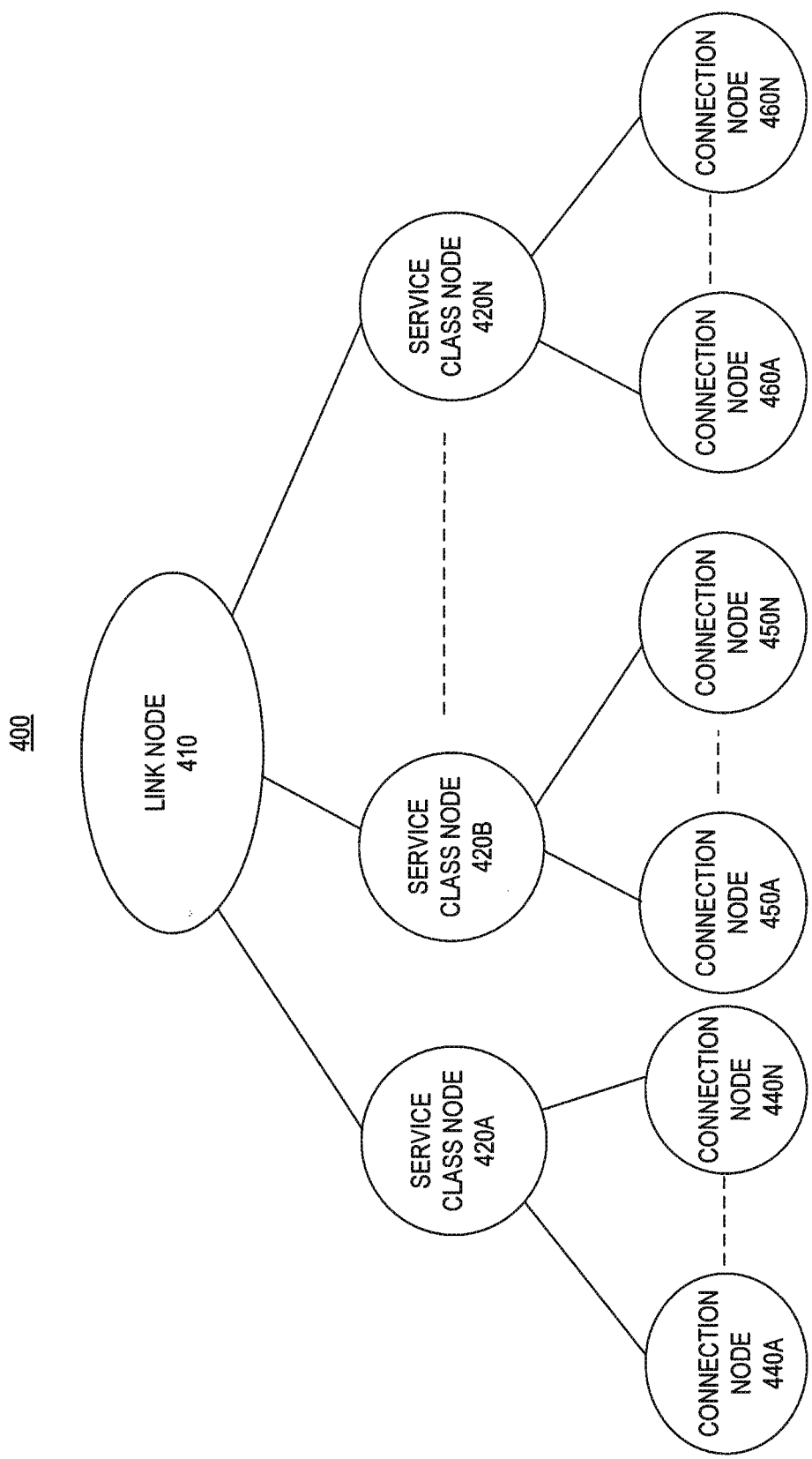
FIG. 4 is a diagram of an exemplary classification tree, consistent with embodiments of the present disclosure.

FIG. 4 is a diagram of an exemplary classification tree 400, consistent with embodiments of the present disclosure. A packet scheduling process can use a classification tree to schedule data packets in response to the scheduling requests sent from one or more packet engines 320A-N. Classification tree 400 can be, for example, an H-WF$^2$Q+ tree for establishing priorities of connections corresponding to the data packets. Classification tree 400 can include a link node 410, one or more service class nodes 420A-N, and one or more connection nodes 440A-N, 450A-N, and 460A-N. Link node 410 can be implemented using one or more source code modules alone or in combination with one or more data structures (referencing its descendent nodes), all of which can be stored in memory 222, storage 228, and/or memory/storage associated with one or more network interfaces 218A-N. As shown in FIG. 4, link node 410 can be connected to one or more services nodes 420A-N, each of which can in turn be connected to one or more connection nodes 440A-N, 450A-N, or 460A-N. In some embodiments, one or more service sub-class nodes (not shown) can exist between a service class node (e.g., service class node 420A) and connection nodes (e.g., connection nodes 440A-N). Therefore, classification tree 400 can have more than 3 levels of hierarchy as shown in FIG. 4. Each internal node (i.e., service-class, sub-service-class, and service-class connection nodes) can represent a logical queue. QoS engine 310 can use these logical queues as a building block to organize how packets will be scheduled for transmission, based on the service classes and priority of these service classes in the classification tree. The organization of link node 410 and service class nodes 420A-N can be implemented using a classification algorithm, such as the WF$^2$Q+ queuing algorithm into a hierarchical structure like the upper nodes of classification tree 400 can be implemented using the H-WF$^2$Q+ algorithm. QoS engine 310 can prioritize the transmission of packets using the algorithm mentioned above by storing pending packets in one or more shared memory pools encompassing all of memory 222 or some portion thereof. Several single read single write queues can be created using memory 222.

For scheduling the data packets, one or more packet engines 320 can provide a scheduling request to QoS engine 310. As described above, a scheduling request can include information such as a packet token (e.g., a pointer to the data packet stored at the corresponding packet engine), a connection token, and information regarding the size of the data packet. In addition, the scheduling request can also include configuration information, such as a link identification, a link rate for the identified link, an identification of a service class, a priority associated with the service class, a service class rate, an identification of a sub-class, and a priority associated with the sub-class. This configuration information is further described in application Ser. No. 13/969,440, which is hereby incorporated by reference.

A scheduling request can include a link identifier and a link rate for the identified link and thus provide the link rate to QoS packer scheduler 310 when, for example, QoS engine 310 does not have the link rate information at initiation. The link rate can be provided to QoS engine 310 when it schedules one or more initial data packets. The link rate can also be provided to QoS engine 310 when, for example, the link rate stored at QoS engine 310 needs to be updated because of a link rate change. As described above, the link rate information indicates, for example, the bandwidth of a particular communication link between two endpoints (for example, a link between a main office in Washington, D.C., and a branch office in Palo Alto, Calif.). QoS engine 310 can thus define the link rate of link node 410 according to the link rate information in the scheduling request. As an example, using the link identifier and the link rate included in a scheduling request, QoS engine 310 can define link node 410 to have a link rate of 4 Gbps.

A scheduling request can also include service class related information including one or more of an identification of a service class, a priority associated with the service class, a service class rate, an identification of a sub-class, and a priority associated with the sub-class. The service class related information can also be provided to QoS engine 310 when scheduling one or more initial data packets or when service class related information stored at the QoS engine 310 needs to be updated. In some embodiments, each unique service class included in a scheduling request creates a service class node under link node 410. For example, in FIG. 4, service class node 420A can represent a UDP service class and can be assigned a priority of 1; service class node 420B can represent an PIP service class and can be assigned a priority of 3; and service class node 420N can represent a TCP service class and can be assigned a priority of 8. In some embodiments, a priority with a higher number represents a higher priority such that the data packets corresponding to connections of that service class can have a higher bandwidth than data packets corresponding to connections of other service classes. In the above example, the TCP service class has the highest priority and can be assigned or allocated, e.g., a bandwidth of 2.666 Gbps out of the total 4 Gbps bandwidth that is available. On the other hand, the FTP service class has a higher priority than the UDP service class, but lower priority than the TCP service class. The FTP service class can be assigned or allocated, e.g., a bandwidth of 1 Gbps. Finally, the UDP service class has the lowest priority and can be assigned or allocated, e.g., the remaining bandwidth of 333 Mbps. The total bandwidth assigned or allocated to service class nodes 420A-N cannot exceed the available bandwidth of the communication link.

A scheduling request can also include connection tokens indicating the type of connections of the data packets. In some embodiments, each connection token can represent a unique connection via a communication link. As shown in FIG. 4, one or more connection nodes (e.g. 440A-N, 450A-N, and 460A-N) corresponding to the connection tokens can be created under the service class nodes 420A-N. Each of the connection nodes can thus represent a unique connection via a communication link. Moreover, one or more data packets can correspond to the same connection and thus have the same connection token. Therefore, one or more data packets can correspond to a same connection node. As an example, as described above, service class node 420A can represent a UDP service class. If, for example, there are total of 3 unique UDP connections under service class node 420A, then 3 connection nodes (e.g., 440A-C) can be created under service node 420A. The 3 unique UDP connections correspond to 3 unique connections of a communication link. Each of the 3 unique connections can in turn correspond to one or more data packets transmitted through the same corresponding connection. In some embodiments, QoS engine 310 can also create and maintain a connection table, which can include all connection nodes corresponding to unique connections.

After QoS engine 310 establishes or updates classification tree 400 using configuration information, the number of connection nodes under each of service nodes 420A-N and the bandwidth assigned to each service node can be determined. For example, if service class node 420A has a bandwidth of 333 Mbps and there are total of 3 connection nodes under service class node 420A, each of the 3 connection nodes can then have a bandwidth of 111 Mbps (i.e., 333 Mbps/3) if the bandwidth of the service class is equally shared among all connections of the service class. That is, each connection can share the assigned or allocated bandwidth at the corresponding service class node for transmitting packets from that connection. But throughput of all connections under a corresponding service class node may not exceed the allocated bandwidth of that service class node. In some embodiments, classification tree 400 can also have more than 3 levels of hierarchy as shown in FIG. 4; and can have any number of service class nodes and connection nodes. Moreover, the bandwidth assigned to each connection node may or may not equal to each other and can have any desired bandwidth.

Figure 5:
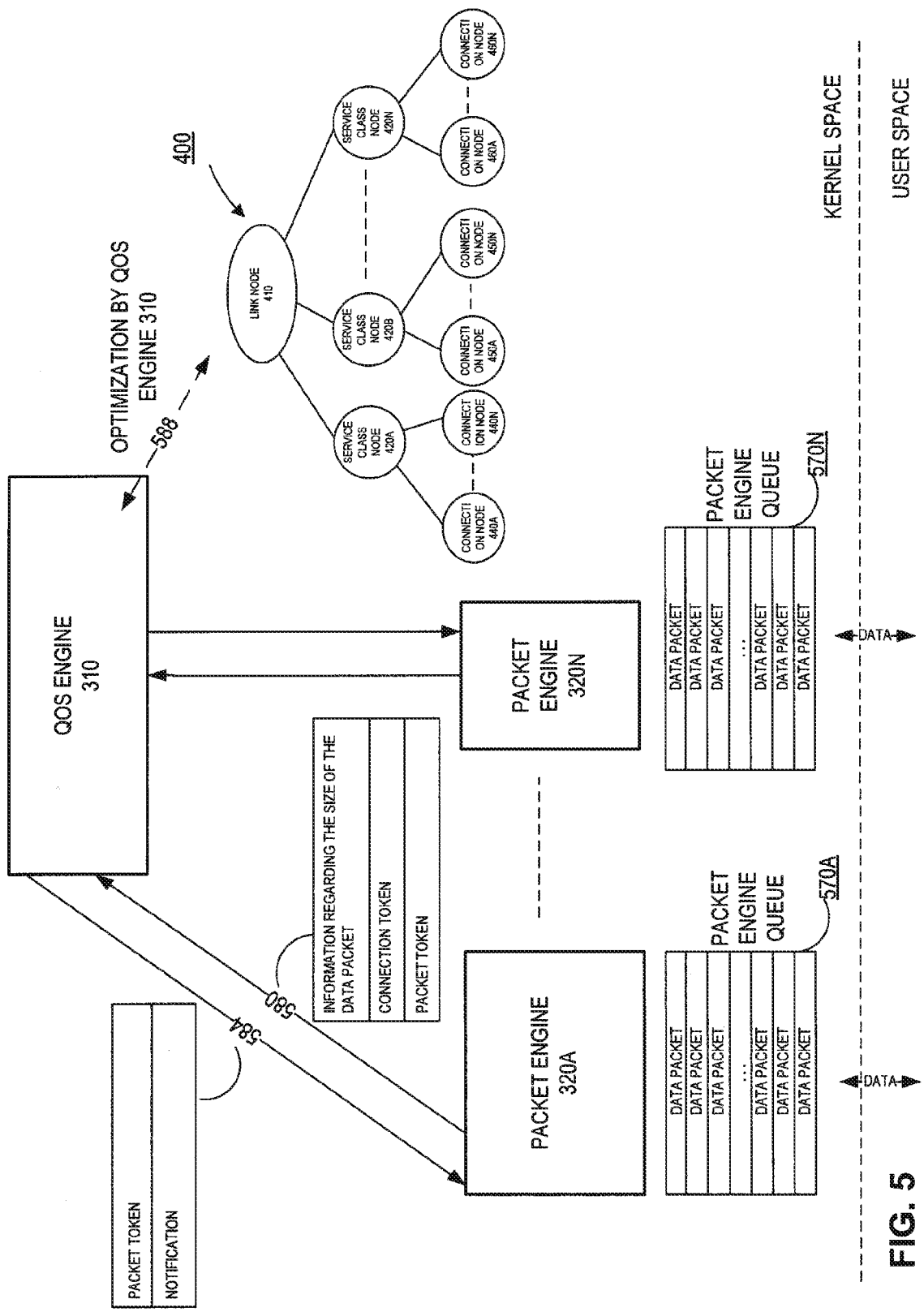
FIG. 5 is a block diagram of an exemplary embodiment for scheduling data packets, consistent with embodiments of the present disclosure.

FIG. 5 is a block diagram of an exemplary embodiment for scheduling data packets, consistent with embodiments of the present disclosure. As described above, one or more classifiers 340 can identify data packets for scheduling and provide configuration information, either in-band or out of band. When they are in-band packets, one or more packet engines 320A-N can receive the modified data packets including the identification and configuration information (e.g. in the source MAC address of the data packets) and store them at one or more packet engine queues 570A-N. When packets are identified as out of band packets, one or more packet engines 320A-N can receive the identification and configuration information along with, but separate from, the unmodified data packets. One or more packet engines 320 can also share the packet engine queues 570 with one or more classifiers 340, thereby avoiding copying of the modified or unmodified data packets. One or more classifiers 340 and one or more packet engines 320 can also be combined or intergraded physically or functionally.

One or more packet engines 320A-N can send scheduling request 580 to QoS engine 310 for scheduling a data packet stored at one or more packet engine queues 570A-N. The scheduling request 580 can include a packet token corresponding to the data packet being scheduled, a connection token, and information regarding the size of the data packet. A packet token identifies the data packet stored at a corresponding packet engine queue. In some embodiments, the packet token can be a pointer to the data packet stored at the corresponding packet engine queue. The packet token can also be a numerical value used by the packet engine to identify a corresponding data packet. The packet token can thus be used by a corresponding packet engine to retrieve the data packet.

Connection token corresponds to a unique network connection (e.g., connection represented by connection node 440A) through which one or more corresponding data packets are received. Connection tokens identify or represent the connection nodes of classification tree 400. A connection token thus can indicate a particular connection of the corresponding data packet, such as a TCP connection.

Scheduling request 580 can also include packet size information corresponding to the data packet being scheduled. Packet size information can be determined, for example, by packet engines 320 from calculating the length of header sections and data sections of the data packet. In some embodiments, QoS engine 310 can use the packet size information and the classification tree 400 to schedule a data packet. As stated above, each connection can share the allocated bandwidth at the corresponding service class node or sub-class node, for transmitting packets from that connection. The packet size information assists QoS engine 310 with identifying packets for transmitting. The packet size information will be further described below.

In some embodiments, scheduling request 580 can also include the configuration information including at least one of a link identification, a link rate for the identified link, an identification of a service class, a priority associated with the service class, a service class rate, an identification of a sub-class, and a priority associated with the sub-class. As described above, when QoS engine 310 needs configuration information to establish or to update classification tree 400, the configuration information can be included in scheduling request 580.

Based on the classification tree 400 and information regarding the size of the data packet, QoS engine 310 can schedule the data packets stored at one or more packet engine queues 570A-N of packet engines 320A-N. For example, QoS engine 310 can send QoS scheduling message 584 to one or more packet engines 320A-N. QoS scheduling message 584 can include a notification for allowing packet engines 320A-N to transmit the corresponding data packet or to drop the corresponding data packet.

QoS scheduling messages 584 can also include some similar information as that included in scheduling requests 580, such as the packet token. By including the packet token, for example, one or more packet engines 320A-N can locate the corresponding data packet for transmission or dropping according to the notification.

In some embodiments, scheduling request 580 and QoS scheduling message 584 can be stored in a same queue of the packet scheduling process. Therefore, scheduling request 580 and QoS scheduling message 584 can also include a message ID, indicating the type of message being communicated between one or more packet engines 320A-N and QoS engine 310. For example, if the message ID is set to be a hexadecimal "4", it can indicate that the message is scheduling request 580 sent from one or more packet engines 320A-N to QoS engine 310 for scheduling a data packet. If the message ID is set to be a hexadecimal "14", it can indicate that the message is QoS scheduling message 584 sent from QoS engine 310 to one or more packet engines 320A-N for allowing the corresponding packet engine for transmitting the data packet.

Figure 6:
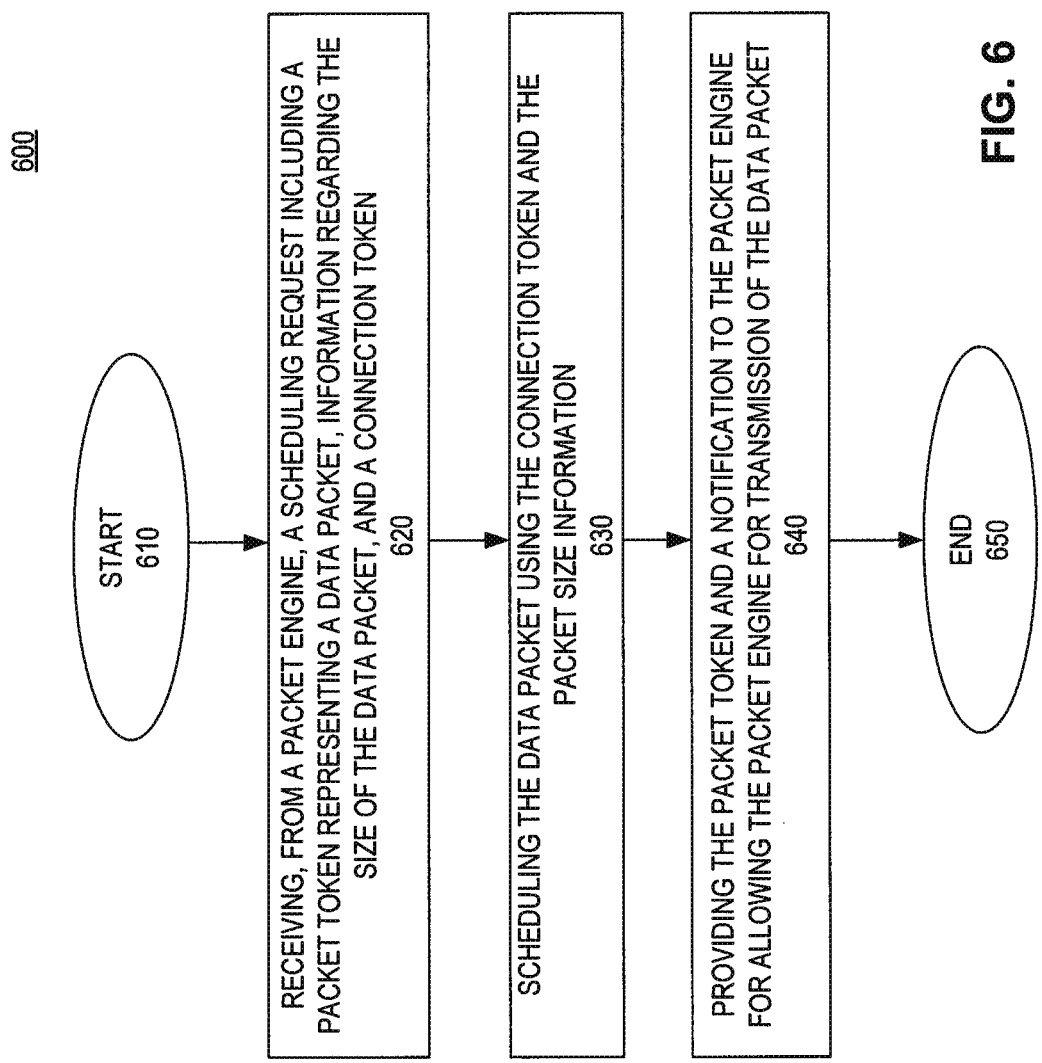
FIG. 6 is a flowchart representing an exemplary method of optimizing network traffic, consistent with embodiments of the present disclosure.

FIG. 6 is a flowchart representing an exemplary method 600 of optimizing network traffic. It will be readily appreciated that the illustrated procedure can be altered to delete steps or further include additional steps. After initial step 610, a packet scheduler (e.g., QoS engine 310) receives (620) a scheduling request from a packet engine of a plurality of packet engines (e.g., packet engines 320A-N). As described above, a scheduling request can include a packet token representing a data packet, information regarding the size of the data packet, and a connection token. A scheduling request can also include a message ID, configuration information, and other information. In some embodiments, the scheduling request can be stored at, for example, one or more of packet scheduling queues, such as a pair of wait-free or lock-free queues, associated with the packet scheduler. The packet scheduling queues can be managed by a packet scheduling process, and can be separate queues from the packet engine queues (e.g., packet engines queues 570A-N) for storing data packets.

The packet token represent a data packet, such as by using a pointer to the data packet stored at the corresponding packet engine. That is, a data packet can be stored and remain in a packet engine queue at the corresponding packet engine and is not forwarded to the packet scheduler for scheduling. In some embodiments, each packet engine has its own packet engine queue and data packets received by a packet engine are stored in the corresponding packet engine queue.

The packet size information corresponds to the data packet identified or represented by the packet token. Packet size information can be determined, for example, by a packet engine from calculating the length of header sections and data sections of the data packet. In some embodiments, the packet scheduler can use the packet size information and a classification tree (e.g., classification tree 400) to schedule the data packet. As stated above, each connection can share an allocated bandwidth of a service class node or a sub-class node for transmitting data packets from that connection. The packet size information can assist the packet scheduler with identifying packets for transmitting.

After receiving the scheduling request, the packet scheduler schedules (630) the data packet using the connection token and the packet size information. The packet scheduler can obtain the connection token included in the scheduling request. The connection token corresponds to a unique network connection through which the data packet is received.

Using the classification tree and the information provided in the scheduling request, the packet scheduler can schedule the data packet. The packet scheduler can also schedule the data packet by taking into account the packet size information. As an example, a data packet having a larger packet size can be scheduled to transmit later than a data packet having a smaller packet size, if the two data packets correspond to a same connection. As another example, the packet size information can also be used in a Weighted Fair Queuing (WFQ) process for scheduling the data packets. WFQ is a data packet scheduling technique allowing different scheduling priorities corresponding to statistically multiplexed data flows. In a WFQ process, priority given to network traffic can be inversely proportional to the signal bandwidth. A WFQ process can be applied at various nodes, e.g., a link node, service class nodes, sub-class nodes, and connection nodes, in a classification tree. For example, when a WFQ process is applied to one or more connection nodes under a common service class node or sub-class node, a virtual start time can be computed by multiplying the packet size of each data packet corresponding to the one or more connections by a normalized inverse of the priority (e.g. bandwidth) assigned or allocated to the corresponding service class node or sub-class node. And the data packets can be scheduled according to their corresponding virtual start time. For example, a data packet having the least virtual start time can be scheduled to transmit first.

After scheduling the data packet, the packet scheduler provides (640) the packet token and a notification to the corresponding packet engine for allowing the packet engine to transmit the data packet over the link. The packet scheduler can send, for example, a QoS scheduling message 584 to one or more packet engines 320A-N. The packet token and the notification can be included in QoS scheduling message 584.

Using the packet token, the corresponding packet engine can locate the data packet in the corresponding packet engine queue that stores the data packet, and either transmit the data packet or drop the data packet depending on the notification. The notification can be a command (e.g., send or drop) or a representation of a command. In some embodiments, the notification can include an indication to the packet engine when the data packet is to be sent. One of ordinary skill in the art would appreciate that the notification can be in any format including numerical, alphabetical, binary, logical, etc., and the scheduling of the data packet can also be indicated in any type of communication between the packet scheduler and the packet engine.

After step 640, process 600 for optimizing network traffic proceeds to an end 650. In some embodiments, process 600 can be repeated to optimize more data packets that are received at the packet engine.

Figure 7:
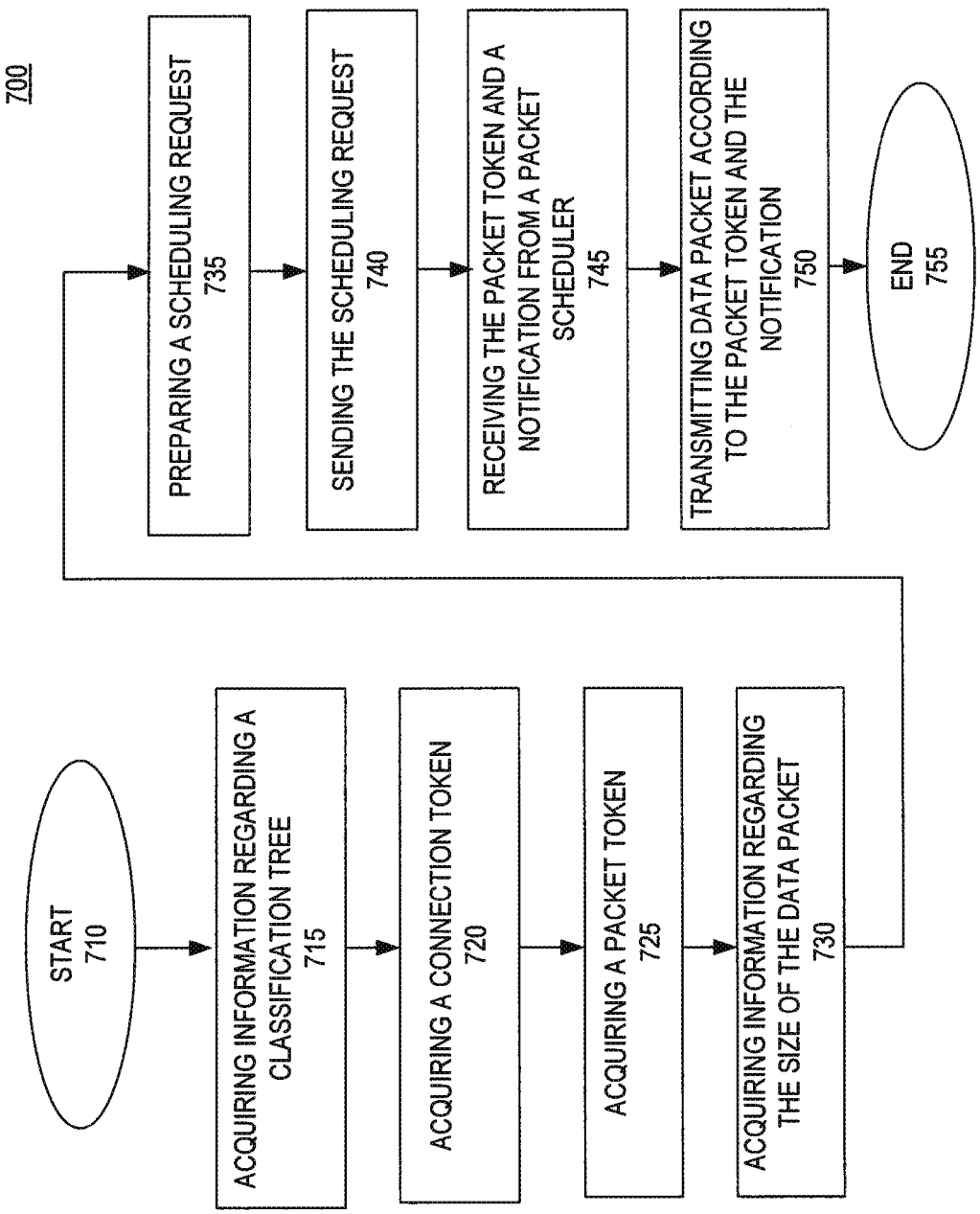
FIG. 7 is a flowchart representing an exemplary method of requesting for scheduling of data packets, consistent with embodiments of the present disclosure.

FIG. 7 is a flowchart representing an exemplary method 700 for providing a scheduling request. It will be readily appreciated that the illustrated procedure can be altered to delete steps or further include additional steps. After an initial start step 710, a packet engine (e.g., packet engine 320A) can acquire (715) information regarding a classification tree (e.g., classification tree 400) or any nodes of the classification tree. For example, this information can include connection-node information that the packet engine can map to a connection token representing a connection node of the classification tree. The packet engine can assign a unique connection token (or identifier) to each connection node. In some embodiments, the value of the connection token increments by one as compared to the connection-token value of the next connection node. For example, a first connection node can have a connection-token real value of "1" or a binary value of "0001," while the second connection node can have a connection-token real value of "2" or a binary value of "0010."

The packet engine can acquire (720) a connection token to the data packet. In some embodiments, the connection token corresponds to a unique network connection. For example, if one or more data packets are transmitted through a same TCP connection, the connection token assigned to the one or more data packets is the same. The connection token can be assigned in any desired manner as long as it corresponds to a unique network connection. In some embodiments, the connection token can be a 64-bit integer that is monotonically incrementing. The connection tokens can be stored, for example, in one or more connection control blocks of the packet engine. The connection control blocks are unique and can be looked up using information from the data packet, including one or more of IP addresses, packet direction, level 3 and level 4 protocols, and communication ports. After assigning a connection token, the packet engine can also include the connection token in the scheduling request.

The packet engine can also acquire (725) a packet token to the data packet. As described above, the packet token can be used for locating the data packet stored at the packet engine. For example, a packet token can be a pointer to the data packet stored at the packet engine. After assigning the packet token, the packet engine can also include the packet token in the scheduling request and send it to the packet scheduler.

The packet engine can also acquire (730) information regarding the size of the data packet corresponding to the data packet. The information regarding the size of the data packet can be obtained, for example, from calculating the length of header sections and data sections of the data packet. After obtaining the information regarding the size of the data packet, the packet engine can include the information regarding the size of the data packet in the scheduling request as well. The packet engine can also include other information, such as the message ID indicating the type of message being communicated between the packet engines and the packet scheduler, in the scheduling request. As described above, a message ID can be used when the scheduling request and the response to the scheduling request are stored in a same packet scheduling queue.

Using the acquired information, the packet engine can prepare (735) a scheduling request (e.g., scheduling request message 580). The scheduling request includes the connection token, the information regarding the size of the data packet, the packet token. In some embodiments, the scheduling request can also include configuration information, a message ID, and any other desired information. It is appreciated that the preparation of the scheduling request can occur at any point prior to its current position in method 700. For example, the scheduling request can be prepared first and the acquired information from steps 720, 725, and/or 730 can be inserted into the scheduling request after the acquisition.

It is also appreciated that the scheduling request can take any format that is desired, and scheduling request message 580 is only for illustration purpose. For example, the scheduling request can have any length and any format conforming to any messaging or communication protocols.

After generating the scheduling request, the packet engine can send (740) the scheduling request to the packet scheduler. After a packet scheduler (e.g., QoS engine 310) schedules the data packet according to the scheduling request, the packet engine can receive (745) the packet token and a notification from the packet scheduler and transmit (750) the data packet accordingly. The packet token and the notification can be included in, for example, QoS scheduling message 584. The packet engine can use the packet token to locate the corresponding data packet stored in its packet engine queue and transmit the data packet or drop the data packet depending on the notification. The notification can be a command (e.g., send or drop) or a representation of a command. In some embodiments, the notification can include an indication to the packet engine when the data packet is to be sent. One of ordinary skill in the art would appreciate that the notification can be in any format including numerical, alphabetical, binary, logical, etc., and the scheduling of the data packet can also be indicated in any type of communication between the packet scheduler and the packet engine.

After step 750, process 700 can proceed to an end 755. In some embodiments, the packet engine prepares and sends one or more scheduling requests for one or more data packets received at the packet engine and thus process 700 can be repeated or processed in parallel for each data packet being scheduled.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A system for optimizing network traffic, the system comprising:

a packet engine of a plurality of packet engines configured to acquire a data packet, to store the data packet in a queue, and to provide a request including a packet token representing the data packet, information regarding the size of the data packet, a connection token representing a connection of a link, and configuration information for establishing or updating a classification tree comprising a link node representing the link, one or more service class nodes, and a plurality of connection nodes representing multiple connections; and a packet scheduler configured to:
receive the request;
schedule the data packet using the connection token, the classification tree representing the link having multiple connections, and the information regarding the size of the data packet; and
provide the packet token and a notification to the packet engine for allowing the packet engine for transmitting the data packet.

2. The system of claim 1, wherein the packet engine is configured to acquire the connection token to the data packet, wherein the connection token is a unique representation of a network connection.

3. The system of claim 1, wherein the packet engine is configured to acquire the packet token to the data packet, wherein the packet token includes a pointer to the data packet stored in the queue.

4. The system of claim 1, wherein the packet engine is further configured to receive the packet token and the notification, acquire the data packet from the queue using the packet token, and transmit the data packet based on the notification.

5. The system of claim 1, wherein the request is stored in a packet scheduling queue that is separate from the queue storing the data packet.

6. The system of claim 1, wherein the queue storing the data packet is associated with the packet engine or associated with one or more other components of the system.

7. A method for optimizing network traffic, the method being performed by one or more processors and comprising:
receiving a data packet at a packet engine;
storing the data packet in a queue associated with the packet engine;
providing a request to a packet scheduler to schedule transmission of the stored data packet, wherein the request includes a packet token representing the data packet, information regarding the size of the data packet, a connection token representing a connection of a link, and configuration information for establishing or updating a classification tree comprising a link node representing the link, one or more service class nodes, and a plurality of connection nodes representing multiple connections;
scheduling the data packet using the connection token, the classification tree representing the link having multiple connections, and the information regarding the size of the data packet; and
providing the packet token and a notification to the packet engine for assisting the packet engine with transmitting the data packet.

8. The method of claim 7, wherein the providing the request comprises acquiring the connection token to the data packet, wherein the connection token is a unique representation of a network connection.

9. The method of claim 7, wherein the providing the request comprises acquiring the packet token to the data packet, wherein the packet token includes a pointer to the data packet stored in the queue associated with the packet engine.

10. The method of claim 7, further comprising receiving the packet token and the notification at the packet engine, acquiring the data packet from the queue using the packet token, and transmitting the data packet based on the notification.

11. A non-transitory computer readable storage medium storing instructions that, when executed by a computer, cause the computer to perform a method for optimizing network traffic, the method comprising:
receiving a data packet at a packet engine;
storing the data packet in a queue associated with the packet engine;
providing a request to a packet scheduler to schedule transmission of the stored data packet, wherein the request includes a packet token representing the data packet, information regarding the size of the data packet, a connection token representing a connection of a link, and configuration information for establishing or updating a classification tree comprising a link node representing the link, one or more service class nodes, and a plurality of connection nodes representing multiple connections;
scheduling the data packet using the connection token, the classification tree representing the link having multiple connections, and the information regarding the size of the data packet; and
providing the packet token and a notification to the packet engine for assisting the packet engine with transmitting the data packet.

12. The non-transitory computer readable storage medium of claim 11, wherein the providing the request comprises acquiring the connection token to the data packet, wherein the connection token is a unique representation of a network connection.

13. The non-transitory computer readable storage medium of claim 11, wherein the providing the request comprises acquiring the packet token to the data packet, wherein the packet token includes a pointer to the data packet stored in the queue associated with the packet engine.

14. The non-transitory computer readable storage medium of claim 11, wherein the instructions further cause the computer to perform the operation of receiving the packet token and the notification at the packet engine, acquiring the data packet from the queue using the packet token, and transmitting the data packet based on the notification.

15. A method for optimizing network traffic, the method being performed by one or more processors and comprising:
receiving a request from a packet engine to schedule transmission of a data packet, wherein the request includes a packet token representing the data packet, information regarding the size of the data packet, a connection token representing a connection of a link, and configuration information for establishing or updating a classification tree comprising a link node representing the link, one or more service class nodes, and a plurality of connection nodes representing multiple connections;
scheduling the data packet using the connection token, the classification tree representing the link having multiple connections, and the information regarding the size of the data packet; and
providing the packet token and a notification to the packet engine for assisting the packet engine with transmitting the data packet.

16. The method of claim 15, wherein the connection token is a unique representation of a network connection.

17. The method of claim 15, wherein the packet token includes a pointer to the data packet stored in a queue associated with the packet engine.

18. A non-transitory computer readable storage medium storing instructions that, when executed by an appliance having one or more processors, cause the appliance to perform a method for optimizing network traffic, the method comprising:
receiving a request from a packet engine to schedule transmission of a data packet stored at the packet engine, wherein the request includes a packet token representing the data packet, information regarding the size of the data packet, a connection token representing a connection of a link, and configuration information for establishing or updating a classification tree comprising a link node representing the link, one or more service class nodes, and a plurality of connection nodes representing multiple connections;
scheduling the data packet using the connection token, the classification tree representing the link having multiple connections, and the information regarding the size of the data packet; and
providing the packet token and a notification to the packet engine for assisting the packet engine with transmitting the data packet.

19. The non-transitory computer readable storage medium of claim 18, wherein the connection token is a unique representation of a network connection.

20. The non-transitory computer readable storage medium of claim 18, wherein the packet token includes a pointer to the data packet stored in a queue associated with the packet engine.

* * * * *